United States Patent [19]

Redmond

[11] 4,153,129

[45] May 8, 1979

[54] AIR CURRENT DEFLECTOR SHIELD FOR VEHICLES

[75] Inventor: Patrick J. Redmond, Grimes, Iowa

[73] Assignee: Deflecta-Shield Corp., Corydon, Iowa

[21] Appl. No.: 850,732

[22] Filed: Nov. 11, 1977

[51] Int. Cl.² .............................................. B60K 11/02
[52] U.S. Cl. .................................... 180/68 P; 296/91
[58] Field of Search ............. 296/15, 91; 242/42.1 D; 180/68 P, 69 R; 160/369, 368 S

[56] References Cited

U.S. PATENT DOCUMENTS

| 2,236,846 | 4/1941 | Davisson | 296/91 |
| 3,815,700 | 6/1974 | Mittendorf | 296/91 X |

Primary Examiner—Joseph F. Peters, Jr.
Assistant Examiner—Gene A. Church
Attorney, Agent, or Firm—Zarley, McKee, Thomte, Voorhees & Sease

[57] ABSTRACT

An air current deflector shield is disclosed comprising a shield member being a single piece of unbroken transparent material, an elongated rigid bracket curved at its mid-point and having a forward wall and rearward wall defining a channel therebetween to receive the lower edge of the transparent shield member and an adhesive material interposed between the lower edge of the shield member and the channel of the bracket to securely bind the shield member to the bracket in the curved shape defined by the bracket. A pair of spaced apart transversely extending support members having bolt receiving apertures therethrough are secured to the lower portion of the bracket for attachment to the body of an automobile.

4 Claims, 3 Drawing Figures

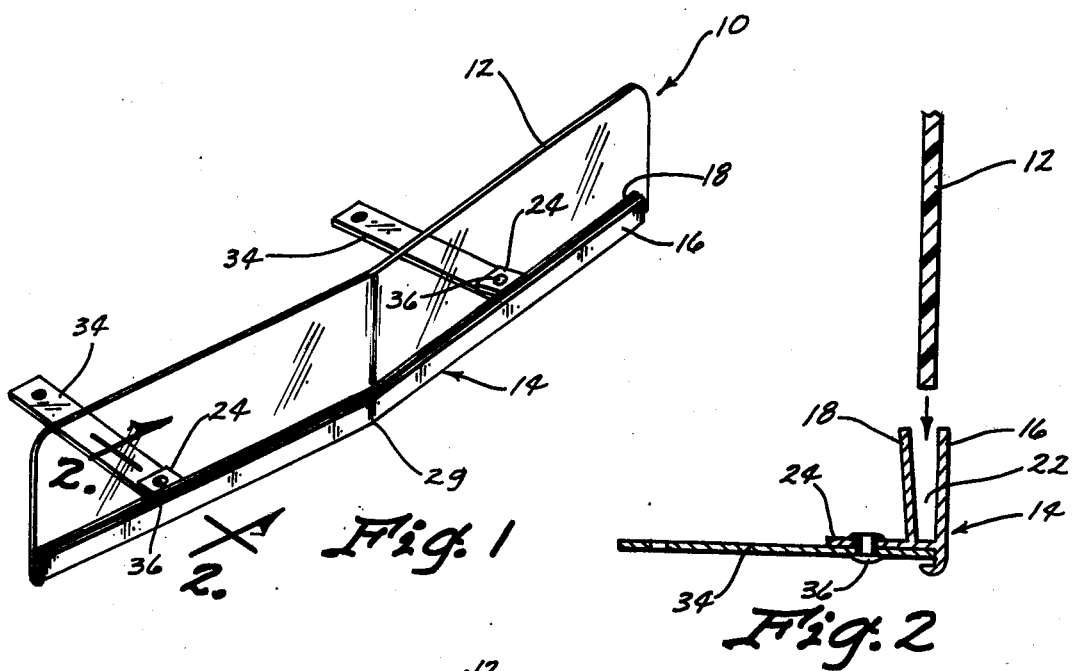
Fig. 1
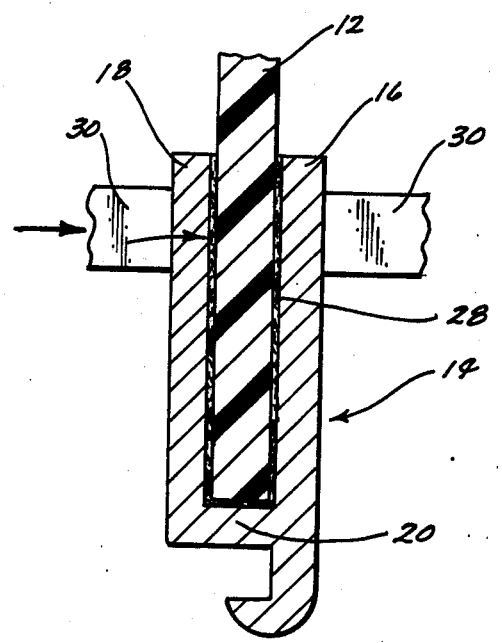
Fig. 2
Fig. 3

AIR CURRENT DEFLECTOR SHIELD FOR VEHICLES

BACKGROUND OF THE INVENTION

This invention relates to deflector shields and particularly to an air current deflector shield for an automobile. Prior deflector shields have been secured to the mounting bracket by either rivets or bolts, thereby necessitating a plurality of apertures through the transparent material usually of a thermoplastic poly type polymer, such as that manufactured under the tradename Plexiglass. Such bolt receiving apertures greatly weaken the transparent material and increase the probability of breakage and cracks. Rivets tend to loosen because of vibration and also may be dislodged by air pressure. Utilization of rivets substantially increase production costs because of the labor force needed to drill and rivet the members together.

SUMMARY OF THE INVENTION

An air current deflector shield for automobiles is disclosed comprising a shield member of a single piece of unbroken transparent material, an elongated rigid bracket curved at its midpoint and having a forward wall and a rearward wall, defining a channel therebetween to receive the lower edge of the transparent shield member, and an adhesive material interposed between the lower edge of the shield member and the channel of the bracket to securely bind the shield member to the bracket in the curved shape defined by the bracket. Because the shield member is a single piece of unbroken transparent material and is attached to the bracket by an adhesive material rather than rivets or bolts, there are no perforations through the shield member, thereby resulting in a shield member of increased strength that greatly reduces breakage during use. The shield member bound by adhesive is less susceptible to dislodging from the bracket because of vibration and is not affected by air pressure during use. Uniform expansion and contraction of the shield member is experienced, thereby reducing stress at the points of attachment to the bracket so as to reduce cracking. Construction is simplified and economical as adhesive attachment is compatible with automated assembly and the labor force is not needed for drilling and riveting.

It is a principal object of this invention to provide an improved air current deflector shield.

A further object of the invention is to provide an air current deflector shield that greatly reduces cracks and breakage during use.

A still further object of the invention is to provide an air current deflector shield that is secured through the mounting bracket by adhesives.

A still further object of the invention is to provide an air current deflector shield that is comprised of a continuous unbroken sheet of transparent material.

A still further object of the invention is to provide an air current deflector shield that is simple and economical to construct.

A still further object of the invention is to provide an air current deflector shield that is durable in use, and refined in appearance.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the invention.

FIG. 2 is an enlarged exploded side view seen on line 2—2 of FIG. 1.

FIG. 3 is an enlarged sectional view similar to FIG. 2.

DESCRIPTION OF THE PREFERRED EMBODIMENT

The numeral 10 generally refers to the air current deflector shield device shown in FIG. 1.

Deflector shield device 10 is comprised of shield member 12 being a single unbroken piece of transparent material preferably of the thermoplastic polymer type such as those produced under the tradenames "Plexiglass", "Lucite" and "Acrylic". Bracket 14 has a forward wall 16, rear wall 18, and bottom wall 20 defining a channel 22 as shown in FIG. 2. A pair of rearwardly extending support members 24 having a bolt receiving aperture therethrough are securely attached to the lower portion of bottom wall 20 and facilitate mounting of deflector device 10 to an automobile body.

Bracket 14 is curved at its midpoint 29 as shown in FIG. 1 so as to impart a curved configuration to shield member 12. Adhesive material 28 is interposed between the lower portion of shield member 12 and the inner surfaces of walls 16, 18 and 20 to securely bind shield member 12 to bracket 14. Prior to bonding, the top portion of rear wall 18 is slightly disposed rearward to facilitate insertion of shield member 12 in channel 22 as illustrated in FIG. 2. Adhesive material 28 is preferably of a two epoxy composition and is applied along the inner surfaces of forward wall 16, rear wall 18 and the upper surface of bottom wall 20 prior to insertion of shield member 12. Upon insertion of shield member 12 into channel 22, a removable clamping device 30 securely holds forward wall 16 and rearward wall 18 against shield member 12 until the adhesive sets as shown in FIG. 3. The secure bonding of seal member 12 to bracket 14 imparts the curved shape of bracket 14 to shield member 12 as shown in FIG. 1. An additional attachment strap 34 to facilitate mounting to the automobile body may be secured to bracket 14 by means of rivet or bolt 36 being received by aperture of support member 24 as shown in FIG. 2. Attachment strap 34 facilitates mounting on those automobiles in which support member 24 is not of sufficient length or configuration for mounting.

In operation, deflector device 10 is mounted on the forward portion of the hood of an automobile and deflects both insects and objects at the same level as the deflector shield. The deflector shield also sets up an air current above the hood of the automobile so as to deflect insects and light objects above the car and prevents them from striking either the hood or the windshield. Because the shield member 12 contains no rivet apertures therethrough, there are no weak spots or flaws in the shield and breakage is greatly reduced or eliminated. Thus, it can be seen that this device accomplishes at least all of its stated objectives.

What is claimed is:

1. An air current deflector shield, comprising,
a shield member comprised of a single piece of unbroken transparent material having a lower edge,
an elongated rigid bracket curved at its midpoint, said bracket having a forward wall and rearward wall defining a channel therebetween, said channel being adapted to receive said lower edge of said shield member, and an adhesive material interposed between said lower edge of said shield member and said channel of said bracket to securely bind said shield member to said bracket in the curved shape defined by said bracket.

2. The device of claim 1 wherein said adhesive comprises a two part epoxy adhesive.

3. The device of claim 1 wherein said bracket comprises at least one transversely extending support member having a bolt receiving aperture therethrough for connection to the body of an automobile.

4. The device of claim 1 wherein at least one of said forward wall or said rearward wall has been forcibly distorted toward the other of said walls to further bind said shield member within said channel.

* * * * *